(12) United States Patent
Wirt et al.

(10) Patent No.: US 8,845,947 B2
(45) Date of Patent: Sep. 30, 2014

(54) METHOD AND APPARATUS FOR MOLDING COMPOSITE ARTICLES

(75) Inventors: John Wirt, Mendota Heights, MN (US); Jay Hood, Commerce, OK (US)

(73) Assignee: VEC Industries, L.L.C., Minneapolis, MN (US)

( * ) Notice: Subject to any disclaimer, the term of this patent is extended or adjusted under 35 U.S.C. 154(b) by 269 days.

(21) Appl. No.: 12/872,918

(22) Filed: Aug. 31, 2010

(65) Prior Publication Data

US 2010/0327496 A1  Dec. 30, 2010

Related U.S. Application Data

(63) Continuation of application No. 12/009,636, filed on Jan. 18, 2008, now Pat. No. 7,758,518.

(60) Provisional application No. 60/881,459, filed on Jan. 19, 2007.

(51) Int. Cl.
| | |
|---|---|
| *B29C 51/10* | (2006.01) |
| *B29C 45/00* | (2006.01) |
| *B29C 70/48* | (2006.01) |
| *B29C 70/44* | (2006.01) |
| *B29C 70/46* | (2006.01) |
| *B29K 101/10* | (2006.01) |
| *B29K 709/08* | (2006.01) |

(52) U.S. Cl.
CPC ............... *B29C 70/48* (2013.01); *B29C 70/46* (2013.01); *B29K 2101/10* (2013.01); *B29C 70/443* (2013.01); *B29K 2709/08* (2013.01)
USPC ......................................... 264/313; 264/571

(58) Field of Classification Search
None
See application file for complete search history.

(56) References Cited

U.S. PATENT DOCUMENTS

| | | |
|---|---|---|
| 604,258 A | 5/1898 | Menier |
| 2,139,631 A | 12/1938 | Dresch et al. |
| 2,367,779 A | 1/1945 | Hull |
| 2,401,299 A | 6/1946 | Glavin |
| 2,422,999 A | 6/1947 | Bagley, Jr. |
| 2,435,866 A | 2/1948 | Bilhuber |
| 2,495,640 A | 1/1950 | Muskat |
| 2,541,297 A | 2/1951 | Sampson et al. |
| 2,617,126 A | 11/1952 | Nebesar |

(Continued)

FOREIGN PATENT DOCUMENTS

| | | |
|---|---|---|
| EP | 0 491 650 A2 | 6/1992 |
| EP | 0 744 263 A2 | 11/1996 |

(Continued)

OTHER PUBLICATIONS

"At Boston Whaler, we take a good thing and make it better," 2 pages (Copyright 1996-1997)).

(Continued)

*Primary Examiner* — Monica Huson
(74) *Attorney, Agent, or Firm* — Merchant & Gould P.C.

(57) ABSTRACT

A method of molding a composite article includes providing a first floating mold that has a fluid backing, wherein the fluid defining the fluid backing is stored in a fluid chamber positioned beneath the first floating mold, providing a second non-floating mold that does not include a fluid backing, and sealing the first floating mold to the second non-floating mold to define a molding chamber therebetween.

8 Claims, 2 Drawing Sheets

(56) References Cited

U.S. PATENT DOCUMENTS

| | | |
|---|---|---|
| 2,658,237 A | 11/1953 | Cuppert et al. |
| 2,866,985 A | 1/1959 | Blackmore |
| 2,903,389 A | 9/1959 | Fujita |
| 2,909,791 A | 10/1959 | Malary, Jr. |
| 2,913,036 A | 11/1959 | Smith |
| 2,975,476 A | 3/1961 | Burke |
| 2,993,822 A | 7/1961 | Reeves |
| 3,028,284 A | 4/1962 | Reeves |
| 3,137,750 A | 6/1964 | Gringras |
| 3,192,297 A | 6/1965 | Gringras |
| 3,309,450 A | 3/1967 | Rodgers |
| 3,315,284 A | 4/1967 | Ludlow |
| 3,368,293 A | 2/1968 | Judkins et al. |
| 3,410,936 A | 11/1968 | Juras |
| 3,442,998 A | 5/1969 | Wiltshire |
| 3,479,666 A | 11/1969 | Webb |
| 3,531,809 A | 10/1970 | Hegg |
| 3,608,143 A | 9/1971 | Schutz |
| 3,675,294 A | 7/1972 | Palfreyman et al. |
| 3,711,581 A | 1/1973 | Fowler, Jr. et al. |
| 3,747,550 A | 7/1973 | Stoeberl |
| 3,761,560 A | 9/1973 | Newlove |
| 3,773,581 A | 11/1973 | Stanley |
| 3,790,977 A | 2/1974 | Bombardier et al. |
| 3,815,863 A | 6/1974 | Andeweg |
| 3,840,312 A | 10/1974 | Paulson et al. |
| 3,840,926 A | 10/1974 | Stoeberl |
| 3,848,284 A | 11/1974 | Livingston |
| 3,871,043 A | 3/1975 | Davidson et al. |
| 3,934,064 A | 1/1976 | Lowthian |
| 3,940,524 A | 2/1976 | Hoppe et al. |
| 3,954,931 A | 5/1976 | Helmuth et al. |
| 3,961,014 A | 6/1976 | Pasch et al. |
| 3,962,394 A | 6/1976 | Hall |
| 3,976,415 A | 8/1976 | Hauser et al. |
| 4,044,188 A | 8/1977 | Segal |
| 4,062,917 A | 12/1977 | Hill et al. |
| 4,065,820 A | 1/1978 | Starratt, Jr. |
| 4,069,290 A | 1/1978 | Pasch |
| 4,088,525 A | 5/1978 | Gowetski et al. |
| 4,098,856 A | 7/1978 | Rosenau |
| 4,099,280 A | 7/1978 | Hoppe et al. |
| 4,120,632 A | 10/1978 | Stoeberl |
| 4,123,488 A | 10/1978 | Lawson |
| 4,161,796 A | 7/1979 | Kostanecki |
| 4,193,367 A | 3/1980 | Benicasa et al. |
| 4,207,282 A | 6/1980 | Grisch |
| 4,214,332 A | 7/1980 | Stoner |
| 4,229,497 A | 10/1980 | Piazza |
| 4,234,633 A | 11/1980 | Gowetski et al. |
| 4,278,401 A | 7/1981 | Martinelli |
| 4,312,829 A | 1/1982 | Fourcher |
| 4,334,850 A | 6/1982 | Garabedian |
| 4,353,964 A | 10/1982 | Grimm et al. |
| 4,365,580 A | 12/1982 | Blount |
| 4,444,832 A | 4/1984 | Mazzola et al. |
| 4,636,422 A | 1/1987 | Harris et al. |
| 4,676,041 A | 6/1987 | Ford |
| 4,693,678 A | 9/1987 | Von Volkli |
| 4,719,871 A | 1/1988 | Fantacci et al. |
| 4,755,341 A | 7/1988 | Reavely et al. |
| 4,762,740 A | 8/1988 | Johnson et al. |
| 4,777,898 A | 10/1988 | Faulkner |
| 4,778,420 A | 10/1988 | Greenberg |
| 4,780,262 A | 10/1988 | Von Volkli |
| 4,786,347 A | 11/1988 | Angus |
| 4,824,631 A | 4/1989 | Yeager |
| 4,851,167 A | 7/1989 | Marc |
| 4,873,044 A | 10/1989 | Epel |
| 4,891,176 A | 1/1990 | Drysdale et al. |
| 4,902,215 A | 2/1990 | Seemann, III |
| 4,910,067 A | 3/1990 | O'Neill |
| 4,940,558 A | 7/1990 | Jarboe et al. |
| 4,955,839 A | 9/1990 | Kaschper |
| 4,976,587 A | 12/1990 | Johnston et al. |
| 5,015,426 A | 5/1991 | Maus et al. |
| 5,020,846 A | 6/1991 | Bonnett |
| 5,035,602 A | 7/1991 | Johnson |
| 5,036,789 A | 8/1991 | Kelly et al. |
| 5,036,790 A | 8/1991 | Berryer |
| 5,045,251 A | 9/1991 | Johnson |
| 5,052,906 A | 10/1991 | Seemann |
| 5,055,025 A | 10/1991 | Muller |
| 5,059,377 A | 10/1991 | Ashton et al. |
| 5,061,418 A | 10/1991 | Ware |
| 5,061,542 A | 10/1991 | Brace |
| 5,063,870 A | 11/1991 | Wagner |
| 5,069,414 A | 12/1991 | Smith |
| 5,071,338 A | 12/1991 | Dublinski et al. |
| 5,085,162 A | 2/1992 | Petrich |
| 5,087,193 A | 2/1992 | Herbert, Jr. |
| 5,106,568 A | 4/1992 | Honka |
| 5,126,091 A | 6/1992 | Melton |
| 5,131,834 A | 7/1992 | Potter |
| 5,151,277 A | 9/1992 | Bernardon et al. |
| 5,152,949 A * | 10/1992 | Leoni et al. .................. 264/257 |
| 5,173,227 A | 12/1992 | Ewen et al. |
| 5,183,619 A | 2/1993 | Tolton |
| 5,204,033 A | 4/1993 | Pearce et al. |
| 5,204,042 A | 4/1993 | James et al. |
| 5,217,669 A | 6/1993 | Dublinski et al. |
| 5,252,269 A | 10/1993 | Hara et al. |
| 5,253,607 A | 10/1993 | Chen |
| 5,266,249 A | 11/1993 | Grimes, III et al. |
| 5,286,438 A | 2/1994 | Dublinski et al. |
| 5,316,462 A | 5/1994 | Seemann |
| 5,375,324 A | 12/1994 | Wallace et al. |
| 5,429,066 A | 7/1995 | Lewit et al. |
| 5,433,165 A | 7/1995 | McGuiness et al. |
| 5,439,635 A * | 8/1995 | Seemann ...................... 264/510 |
| 5,458,844 A | 10/1995 | MacDougall |
| 5,460,761 A | 10/1995 | Larsson |
| 5,494,426 A | 2/1996 | Ibar |
| 5,499,904 A | 3/1996 | Wallace et al. |
| 5,505,030 A | 4/1996 | Michalcewiz et al. |
| 5,516,271 A | 5/1996 | Swenor et al. |
| 5,518,388 A | 5/1996 | Swenor et al. |
| 5,526,767 A | 6/1996 | McGuiness et al. |
| 5,533,463 A | 7/1996 | Marchetti et al. |
| 5,549,857 A | 8/1996 | Kamiguchi et al. |
| 5,558,038 A | 9/1996 | McNamara |
| 5,567,499 A | 10/1996 | Cundiff et al. |
| 5,569,508 A | 10/1996 | Cundiff |
| 5,588,392 A | 12/1996 | Bailey |
| 5,601,048 A | 2/1997 | MacDougall |
| 5,601,852 A | 2/1997 | Seemann |
| 5,614,135 A | 3/1997 | Maleczek |
| 5,615,508 A | 4/1997 | Miller et al. |
| 5,634,425 A | 6/1997 | MacDougall |
| 5,664,518 A | 9/1997 | Lewit et al. |
| 5,665,301 A | 9/1997 | Alanko |
| 5,666,902 A | 9/1997 | White et al. |
| 5,699,750 A | 12/1997 | Schneider |
| 5,702,663 A | 12/1997 | Seemann |
| 5,714,104 A | 2/1998 | Bailey et al. |
| 5,721,034 A | 2/1998 | Seemann, III et al. |
| 5,753,151 A | 5/1998 | McBride |
| 5,787,836 A | 8/1998 | Blaisdell et al. |
| 5,800,749 A | 9/1998 | Lewit et al. |
| 5,837,185 A | 11/1998 | Livesay et al. |
| 5,851,336 A | 12/1998 | Cundiff et al. |
| 5,875,731 A | 3/1999 | Abernethy et al. |
| 5,897,818 A | 4/1999 | Lewit et al. |
| 5,904,972 A | 5/1999 | Tunis, III et al. |
| 5,908,591 A | 6/1999 | Lewit et al. |
| 5,955,025 A | 9/1999 | Muller |
| 5,958,325 A | 9/1999 | Seemann, III et al. |
| 5,971,742 A | 10/1999 | McCollum et al. |
| 6,004,492 A | 12/1999 | Lewit et al. |
| 6,013,213 A | 1/2000 | Lewit et al. |
| 6,032,606 A | 3/2000 | Fulks |
| 6,143,215 A | 11/2000 | McCollum et al. |
| 6,159,414 A | 12/2000 | Tunis, III et al. |
| 6,161,496 A | 12/2000 | Fulks |

(56) References Cited

U.S. PATENT DOCUMENTS

| | | |
|---|---|---|
| 6,206,669 B1 | 3/2001 | Lewit et al. |
| 6,286,448 B1 | 9/2001 | Sahr et al. |
| 6,367,406 B1 | 4/2002 | Sahr et al. |
| 6,497,190 B1 | 12/2002 | Lewit |
| 6,543,469 B2 | 4/2003 | Lewit et al. |
| 6,558,608 B2 | 5/2003 | Haraldsson et al. |
| 6,723,273 B2 | 4/2004 | Johnson et al. |
| 6,755,998 B1 | 6/2004 | Reichard et al. |
| 6,773,655 B1 | 8/2004 | Tunis, III et al. |
| 6,869,561 B2 | 3/2005 | Johnson et al. |
| 6,994,051 B2 | 2/2006 | Sahr et al. |
| 7,156,043 B2 | 1/2007 | Sahr et al. |
| 7,338,628 B2 | 3/2008 | Sisk |
| 7,373,896 B2 | 5/2008 | Sahr et al. |
| 7,785,518 B2 | 8/2010 | Wirt et al. |
| 2002/0047224 A1 | 4/2002 | McCollum et al. |
| 2005/0048350 A1* | 3/2005 | Andrews et al. ............ 429/36 |

FOREIGN PATENT DOCUMENTS

| | | |
|---|---|---|
| GB | 879769 | 10/1961 |
| JP | 49-35067 | 9/1974 |
| JP | 57-18586 | 1/1982 |
| JP | 4-74620 | 3/1992 |
| WO | WO 96/07532 | 3/1996 |
| WO | WO 98/12034 | 3/1998 |

OTHER PUBLICATIONS

"Prisma® Composite Preforms. A Step Towards the Toughest Boat," Compsys, Inc., 5 pages (Date Unknown).

"Take Advantage of the Prisma Strake Filler," *The Compsys Quarterly*, vol. 1, Issue 1, 2 pages (Aug. 1, 2002).

A. Delaney and H. Dochtermann, Plastic Molding Apparatus, IBM Technical Disclosure Bulletin, vol. 17, No. 2, pp. 479-480.

Boston Whaler, 8 pages (Copyright 2004-2005).

Compsys, Inc. Catalog, 2 pages (Date Unknown).

Information about Compsys, Inc., 4 pages (Date Unknown).

International Search Report and Written Opinion mailed Jul. 7, 2008.

Island Packet Yachts. America's Cruising Yacht Leader. Factory Tour, 18 pages (Copyright 2004).

Rosato, Dominick and Rosato, Donald, Injection Molding Handbook, Van Nostrand Reinhold Co., p. 210.

* cited by examiner

METHOD AND APPARATUS FOR MOLDING COMPOSITE ARTICLES

CROSS REFERENCE TO RELATED APPLICATIONS

This application is a continuation of application Ser. No. 12/009,636, filed Jan. 18, 2008, now U.S. Pat. No. 7,785,518, which claims the benefit of provisional application Ser. No. 60/881,459, filed Jan. 19, 2007, which applications are incorporated herein by reference in their entirety.

TECHNICAL FIELD

The present disclosure relates generally to the manufacture of injection molded articles. Such articles can be molded from a polymer thermoset resin or can be composite articles that are articles having a fiber reinforcement lattice within a cured resin matrix. More particularly, the present disclosure relates to a method and apparatus for injection molding such polymer and composite articles.

BACKGROUND

Reaction injection molding and resin transfer molding are processes wherein dry fiber reinforcement plys (preforms) may be loaded in a mold cavity whose surfaces define the ultimate configuration of the article to be fabricated, whereupon a flowable resin is injected, or vacuumed, under pressure into the mold cavity (mold plenum) thereby to produce the article, or to saturate/wet the fiber reinforcement preforms, where provided. After the resinated preforms are cured in the mold plenum, the finished article is removed from the mold.

Improvements in the manufacture of injection molded articles are desired.

SUMMARY

One aspect of the present disclosure relates to a method and an apparatus for manufacturing an injection molded article.

According to another aspect, the present disclosure relates to a method and apparatus for manufacturing an injection molded article using a first mold that is a liquid-backed semi-rigid floating mold in combination with a second mold (e.g., a semi-rigid mold or a thin polymeric sheet), wherein resin may be injected, with the assist of vacuum, into the plenum created between the two molds.

A variety of advantages of the inventive aspects of the disclosure will be set forth in the description that follows, and in part will be apparent from the description, or may be learned by practicing the inventive aspects of the disclosure. It is to be understood that both the foregoing general description and the following detailed description are exemplary and explanatory only and are not restrictive of the inventive aspects claimed.

BRIEF DESCRIPTION OF THE DRAWINGS

The accompanying drawings, which are incorporated in and constitute a part of this specification, illustrate several aspects of the disclosure and together with the description, serve to explain the principles of the inventive aspects of the disclosure. A brief description of the drawings is as follows.

DETAILED DESCRIPTION

Reference will now be made in detail to examples of inventive aspects in accordance with the principles of the present disclosure that are illustrated in the accompanying drawings. Wherever possible, the same reference numbers will be used throughout the drawings to refer to the same or like parts.

Figure 1:
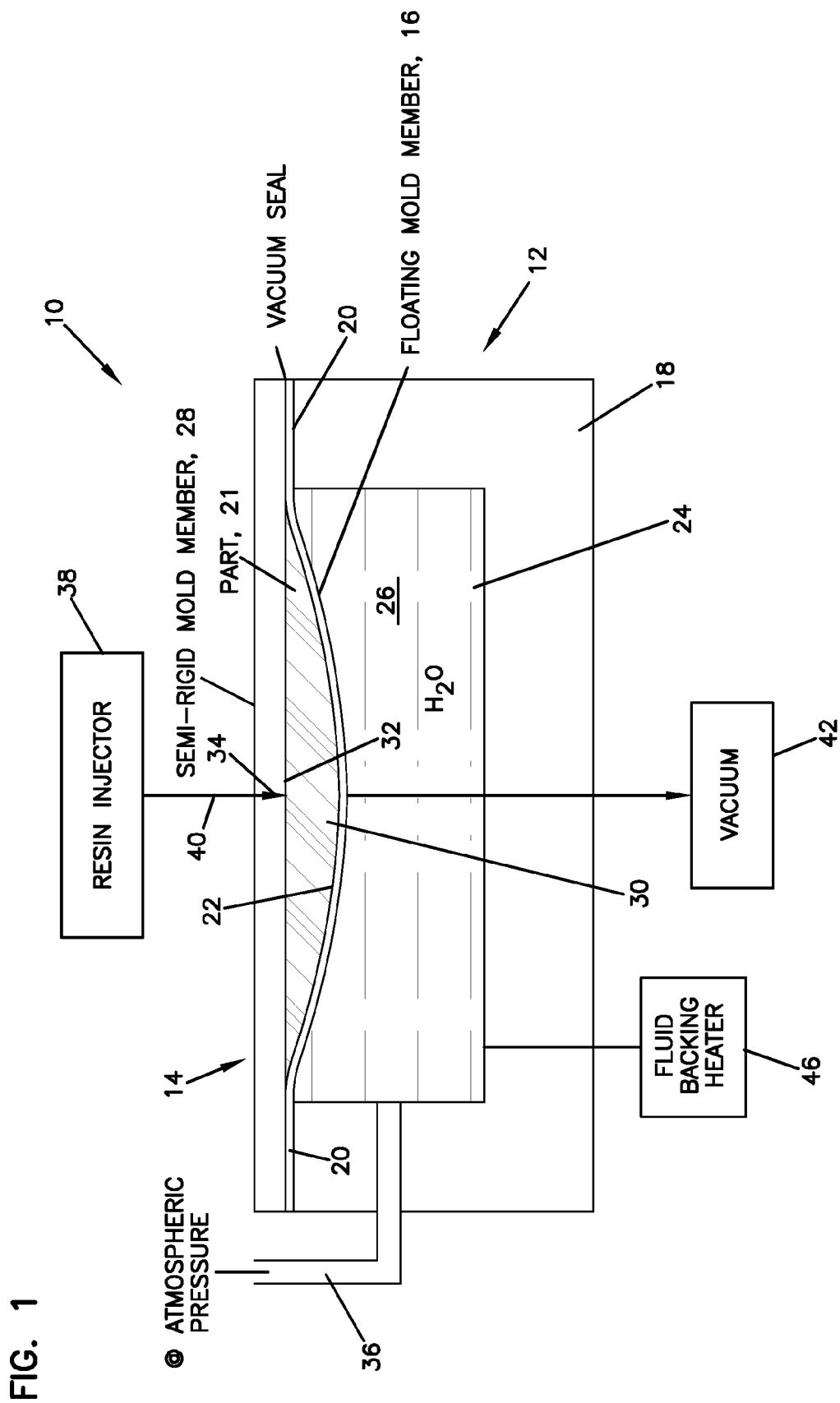
FIG. 1 is a schematic diagram illustrating a first embodiment of an injection molding apparatus and method having features that are examples of inventive aspects in accordance with the principles of the present disclosure.

An apparatus 10 embodying examples of inventive aspects in accordance with the principles of the present disclosure is illustrated schematically in FIG. 1. It should be understood that, while the apparatus and method described herein may be suitable for injection molding of boat components, the apparatus and method can be used for the manufacture of any molded article.

Referring to FIG. 1, the injection molding apparatus 10 includes a first mold section 12 and a second mold section 14. The first mold and the second mold sections 12, 14 can be referred to herein as the lower mold and the upper mold sections, respectively. The lower mold section 12 includes a semi-rigid mold member 16 that is supported on top of a rigid outer support housing 18. The lower mold member 16 may be sealed against the outer housing 18 at its flanges 20. The lower mold member 16 has an inner molding surface 22 having the shape of the outer surface of an article 21 to be manufactured.

The outer support housing 18 includes a fluid-tight chamber 24. The semi-rigid mold member 16 is supported by a substantially non-compressible heat-conductive fluid backing 26 that is located within the fluid-tight chamber 24. The semi-rigid mold member 16, since it has a fluid backing 26, can be referred to herein as the floating mold member 16. In one embodiment, the floating mold member 16 may be about 3/8 of an inch to about 5/8 of an inch in thickness.

The upper mold section 14 also includes a semi-rigid mold member 28. The floating mold member 16 works in combination with the semi-rigid mold member 28 of the upper mold section 14, which mounts over the floating mold member 16, to form the molding plenum 30 (i.e., molding chamber or molding cell) thereinbetween. In certain embodiments, the upper semi-rigid mold member 28 may be a relatively thin, fiberglass mold member. In one embodiment, the upper semi-rigid mold member 28 may be as thin as 1/8 of an inch. In other embodiments, the upper semi-rigid mold member 28 may be thicker.

The upper semi-rigid mold member 28 has an inner surface 32 having the shape of the outer surface of the article 21 to be manufactured, wherein the upper and the lower mold members 28, 16 are configured to shape opposing outer surfaces of the article 21. The semi-rigid upper mold member 28 may also define injection port(s) 34 communicating with the molding chamber 30 for injection of resin into the chamber 30, as will be discussed in further detail below.

In certain embodiments, both the upper mold member 28 and the lower floating mold member 16 are capable of slightly flexing when pressurized resin is injected into the mold chamber 30. In one embodiment, the upper and the lower mold members 28, 16 may be made of sheets of metal. In other embodiments, the upper and the lower mold members 28, 16 can be made of other materials such as fiberglass, plastic, reinforced nylon, etc. Preferably, materials that are conveniently and cost-effectively fabricated, shaped and reshaped in a pressure chamber in a matter known to those skilled in the art would be suitable. In this regard, use of different materials for the mold members 28, 16 may be chosen, for example, upon the desired characteristics for the mold members (e.g., thermal conductivity, formability, and usable life), the desired characteristics of the fabricated article (e.g., surface finish and gloss), and/or overall process parameters (e.g., resin injection pressures, resin cure time and mold assembly cycle time).

Once the upper mold member 28 is placed on top of the floating mold member 16, a vacuum double seal can be used to hold the upper semi-rigid mold member 28 against the floating mold member 16 during resin injection.

As noted above, to prevent the floating mold member 16 from excessively deforming during the molding process, the fluid-chamber 24 is preferably filled with the non-compressible liquid 26, such as water. In this regard, the fluid-chamber 24 preferably includes inlet(s) (not shown) for filling the chamber 24 with the non-compressible liquid 26. The inlets may be opened and closed by valves as known in the art.

By filling the fluid chamber 24 with the non-compressible liquid 26 and then sealing the chamber 24 with the floating mold member 16, the liquid 26 retained within the chamber 24 provides backing support to the floating mold member 16 such that deformation of the mold member 16 is resisted. The fluid chamber 24 is completely filled with the substantially noncompressible heat-conductive fluid 26 supplied by a fluid supply network, and, once the fluid chamber 24 is full, the mold apparatus 10 becomes ready to be used to manufacture articles.

The fluid backing 26 under the lower mold member 16 provides support in compression during resin injection. Since the fluid 26 is substantially non-compressible, any force exerted on the floating mold member 16, such as internal injection pressures, is normally transferred through the fluid 26 to the walls of the rigid outer housing 18. Thus, due to the non-compressibility of the backing fluid 26, the floating mold member 16 may act as a hydraulic system. As will be discussed further below, once the resin injection starts, the pressure within the backing fluid 26 starts to build up but is maintained at atmospheric pressure through a pressure vent 36.

Due to the semi-rigid character of the mold members 16, 28, the mold members 16, 28 can dimensionally flex slightly during the injection of molding resin as the backing fluid 26 distributes the resulting injection pressure load across the entire surface of the mold members 16, 28. In this manner, the semi-rigid mold members 16, 28 avoid extreme stress concentrations on the molding surfaces 22, 32 during injection. Indeed, the slight flexing of the mold members 16, 28 during injection is believed to further improve or enhance the flow of resin through the mold plenum 30.

For the molding apparatus 10 discussed herein, the backing fluid 26 can be water which may be supplied by a fluid network to the fluid chamber 24 through an inlet valve (not shown). Water is generally the preferred fluid since it is inexpensive, readily available and environmentally friendly. However, other suitable backing fluids useful over different operating ranges (e.g., having higher vaporization temperatures) known to those skilled in the art may be used. A pressure gauge (not shown) may be employed downstream of the fluid inlet valve to monitor the flow rate of the backing fluid 26 into the chamber 24. To facilitate the filling and emptying of the chamber 24, the chamber 24 can have a vent through which air within the chamber 24 may escape upon the filling thereof with backing fluid 26. Once filled, the chamber's vent may be sealed with a vent valve, thereby imparting requisite rigidity to the lower floating mold member 16. As discussed above, during resin injection, as the pressure in the water builds up, the pressure can be equalized to atmospheric pressure through the pressure vent 36.

Still referring to FIG. 1, the molding apparatus 10 includes a resin injection structure 38 for introducing resin into the molding chamber 30. For example, an injection sprue 40 that extends through the upper semi-rigid mold member 28 is used for injecting resin into the molding chamber 30, as shown schematically. Preferably, the sprue 40 is placed in fluid communication with a source of resin (e.g., a source of liquid thermoset resin) such that resin can be pumped from the source of resin through the sprue 40 into the molding chamber 30. While a single sprue 40 has been shown schematically in FIG. 1, it will be appreciated that multiple sprues can be provided to provide uniform resin flow throughout the molding chamber 30.

As noted, the injection sprue 40 may extend through the upper mold member 28 to provide a pathway through which a desired type of thermoset resin from a molding fluid supply may be injected under pressure by a suitable injection pump into the mold plenum 30. The number and placement of such sprues, again, depends upon the configuration and desired characteristics of the article to be molded, and the flow characteristics of the molding resin employed, in a manner known to those skilled in the art. In this regard, a number of small vents can be provided between the opposed mold members 16, 28, through which trapped air may bleed to the atmosphere during injection of the molding resin into the mold plenum 30. Alternatively, other, conventional methods of providing for the escape of trapped air from the mold plenum 30 may be employed.

For molding purposes, prior to securing the upper semi-rigid mold member 28 to the lower floating mold member 16, to enhance the aesthetic appearance of the article 21 to be manufacture, the lower mold member 16 may be coated with a layer of gel coat prior to enclosing fibrous reinforcing material within the cell 30. Additionally, barrier coat layers may also be provided over the layers of gel coat for preventing the fibrous reinforcing material from printing or pressing through the gel coat layers. An exemplary barrier coat layer may be a layer of vinyl ester having a thickness of about 0.025 inches. In one embodiment, the gel coat layer can have a thickness of about 0.020-0.024 inches.

Once the fibrous reinforcing material and other desired layers are placed in the mold chamber 30, the upper mold member 28 is placed over the floating mold member 16 to enclose the mold chamber 30.

Thereafter, a vacuum assist system 42 is used to saturate the fiberglass with resin, as will be discussed in further detail below. The resin is injected with pressure into the molding chamber 30 and a vacuum 42 is used to move resin through the fiberglass. The optimal flow rate at which the molding resin is injected is based upon a number of factors well known to those skilled in the art. Once the mold plenum 30 is completely filled with molding resin, the injection ceases. Whether the mold plenum 30 is completely filled can be confirmed in a number of different methods, including visually, via sensors, etc.

As discussed above, as the resin is injected into the plenum 30, the pressure within the backing fluid 26 is preferably maintained at atmospheric pressure. The upper mold member 28 may be flexible enough to allow movement and allow resin to move as well. The upper mold member 28 is configured to also allow for the vacuum 42 to draw excess resin out of the part at the end of the cycle to eliminate resin rich areas. This may be accomplished by turning off the resin injection structure 38 and only drawing a vacuum 42.

To optimize the molding process, various devices commonly known to those skilled in the art can be employed to provide feedback which can be utilized to adjust different parameters of the molding process, such as the injection rate, etc., to improve the quality of the molded article 21.

It will be appreciated that the molding apparatus 10 can include a variety of additional structures for enhancing the molding process. For example, as will be discussed in further detail below, the liquid 26 providing the backing to the floating mold member may be heated. By heating the backing fluid 26, the cure speed of the resin within the molding chamber 30 may be increased so that parts 21 removed from the mold can be 97-98% cured. This helps resist shrinkage and provides a smooth finish. Also as mentioned above, the vacuum 42 may be used to draw the resin through the molding chamber 30.

Referring to FIG. 1, the molding process is discussed. After application of a release coat, a gel coat, and a skincoat (if desired) to the inner surface 22 of the lower mold member 16, reinforcement material is placed on the inner surface 22 of the lower mold member 16. According to one embodiment, the reinforcement material may be dry material. The reinforcement material may include various types of fibrous material including chopped glass fiber, chopped strand mat, cut rovings, woven rovings, or a combination of these. In certain embodiments, the molding apparatus 10 may also be used to form molded articles from a curable fiber reinforced composite sheet, optionally, without injecting molding resin.

Next, other structural members (if desired) may be placed on top of the reinforcement material. Once the semi-rigid upper mold member 28 is vacuum sealed to the floating mold member 16, injection of the resin starts.

During the injection process, the plenum 30 may communicate with a vacuum system 42, as illustrated schematically in FIG. 1, to create a vacuum in the molding chamber 30. The vacuum system may include a vacuum pump, as know in the art. The pump reduces the pressure, relative to the ambient pressure, in the mold chamber 30. Alternatively, any suitable arrangement can be employed for reducing the pressure in the mold chamber 30 relative to the ambient pressure. After a vacuum has been drawn in the mold chamber 30, resin is injected through injection ports 34 that run through the upper mold member 28 into the mold chamber 30.

Any suitable resin can be employed. The molded fiber reinforced article 21 may comprise curable thermoset resin such as unsaturated polyester resin. Suitable thermosetting resins include acrylic polymers, aminoplasts, alkyd, polyepoxides, phenolics, polyamides, polyolefins, polyesters, polyurethanes, vinyl polymers derivatives and mixtures thereof.

Because of the reduced pressure in the mold chamber 30, resin does not have to be injected under significant pressure. In certain embodiments, the resin may be injected at a pressure less than 15 psi. The resin can completely fill the mold chamber 30, saturating the dry reinforcement material. The vacuum is maintained until the resin is cured. The upper semi-rigid mold member 28 is then removed from the floating mold member 16 to remove the molded article 21.

As discussed above, the molding apparatus 10 can include a variety of additional structures for enhancing the molding process. For example, the molding apparatus 10 can include a heating and/or cooling mechanism 46 for controlling the temperature of the fluid 26 contained in the fluid chamber 24. Additionally, as noted previously, the fluid chamber 24 can include closeable vents for allowing air to be bled from the fluid chamber 24 as the fluid chamber 24 is filled with liquid. Furthermore, the molding chamber 30 can include closeable vents for bleeding resin from the molding chamber 30 once the molding chamber 30 has been filled with resin.

As seen in the schematic diagram of FIG. 1, the fluid chamber 24 may be in communication with a fluid backing heating and/or cooling mechanism 46. Such a mechanism 46 may comprise a system of heating and/or cooling coils (not shown) extending within the fluid chamber 24 for regulating the temperature of the backing fluid 26, thus the mold chamber 30. The heating and/or cooling coils can be coupled to an external heater and/or chiller of conventional design of the mechanism 46, as illustrated schematically. As such, the coils operate in conjunction with the heater and/or chiller 46 to precisely regulate the temperature of the backing fluid 26 and, hence, of the molding chamber 30 throughout the injection molding process.

Although the coils are not specifically illustrated in FIG. 1, it should be noted that the thermal conductivity of the backing fluid 26 enables substantial design variation with respect to placement of the coils within the fluid chamber 24.

In addition, while the mold members 16, 28 of the exemplary apparatus 10 are shown in FIG. 1 as being of relatively uniform thickness, the efficiency with which mold temperature may be controlled under the present process permits the use of variable-thickness members, as may be desirable, for example, when providing the finished article with reinforcement ribs.

To the extent that the backing fluid 26 with which the chamber 24 is filled is supplied at a temperature different from the desired process temperature, upon subsequent heating or cooling of the fluid backing 26 to the desired temperature, any resulting thermal expansion thereof can be accommodated by the pressure vent 36, thereby preventing distortion and/or extreme stress on the mold members 16, 28.

When the fluid chamber 24 is being filled, the chamber 24 is sealed with its respective valve and the heater and/or chiller 46 are operated to bring the chamber 24 to the desired process temperature. The fluid inlet valve is thereafter closed to isolate the fluid chamber 24 from the fluid supply network.

The temperature of each mold member 16, 28 can be regulated via operation of the heater and/or chiller 46 to thereby provide an optimum cure rate with which to obtain the desired surface finish and/or other desired characteristics of the finished article 21, or to otherwise optimize the molding process.

The heater and/or the chiller units 46 are operated to bring the mold chamber 30 to the desired process temperature. Typically, the fluid chamber 24 is filled with backing fluid 26 prior to forming the first molded article and topped-off with backing fluid 26 as necessary before the subsequent molding steps in order to maintain the fluid chamber 24 in a completely filled state. The temperature of the backing fluid 26 may be adjusted before or after engaging the mold members 16, 28 to form the composite article. The backing fluid 26 provides precise control of the temperature of the mold members 16, 28 and enables the temperature of the mold chamber 30 to be varied according to the optimum cure temperature and cure rate for the reinforced composite article.

In certain embodiments, a backing fluid pump (not shown) can also be provided to increase the pressure in the fluid chamber 24 by pumping fluid into the chamber 24 after injection is complete. If the pressure vent 36 is closed, this increases the pressure in the fluid chamber 24 which effectively increases the pressure in the mold plenum 30. This might be desirable, for example, after the mold is filled in order to speed up the curing process of the resin to increase the cycle time. In one embodiment, using the process described herein, the entire process to mold a composite article may be less than about 90 minutes. In one embodiment, the injection start to cure time may be about 60 minutes.

Preferably, the fluid filled chamber 24 provides excellent thermal conductivity which permits superior mold temperature control. A floating mold member 16 according to the disclosure provides a stable and controllable mold surface temperature which permits molding to be performed without needing to compensate for ambient conditions. The controlled temperature ranges permit the resin flow to be much faster in cycle times and provide the added bonus of the chemical reaction's optimal control limits being unaffected by the ambient temperature ranges that can otherwise effect production rates. Thus, such a closed-mold system 10 creates new controls and predictability in the production of molded parts as well as improved cosmetics.

In using the molding apparatus 10 illustrated in FIG. 1, molding differently configured parts may be as simple as removing one set of mold members 16, 28 and replacing them with a differently configured set.

Some benefits of the floating mold member 16 and the semi-rigid mold member 28 that is mounted on the floating mold member 16 are flexibility, reduced cost, speed to market and increased closed molding performance. For example, when a part design is changed, rather than creating new molds and obsoleting current molds, or performing expensive mold modifications, the mold members 16, 28 may simply be changed out.

One example application for the molding apparatus 10 of the present disclosure is for molding of boat decks and hulls. The mold members 16, 28 can be changed to create different parts whenever needed.

Besides of the use of the closed-loop temperature regulating system, the containment of the non-compressible fluid 26 remains an advantageous feature of the present apparatus 10. Since the fluid 26 is confined and because the fluid 26 is noncompressible, it serves to strengthen the floating mold member 16. By using the fluid 26, the floating mold member 16 can be formed in a very thin layer. Consequently, heat transfer control of the molded part may be enhanced and the mold members 16, 28 can be formed more easily and less expensively. Preferably, each mold member 16, 28 can be formed from a highly thermally-conductive material. The relatively large volume of fluid 26, such as water, also provides a relatively stable temperature environment, since it resists rapid fluctuations in temperature which can adversely affect the molded part.

Exemplary fluid-backed, closed-loop temperature regulated systems using floating mold members are disclosed in U.S. Pat. Nos. 6,143,215, 6,623,672, and 6,994,051, which are incorporated herein by reference in their entirety.

Figure 2:
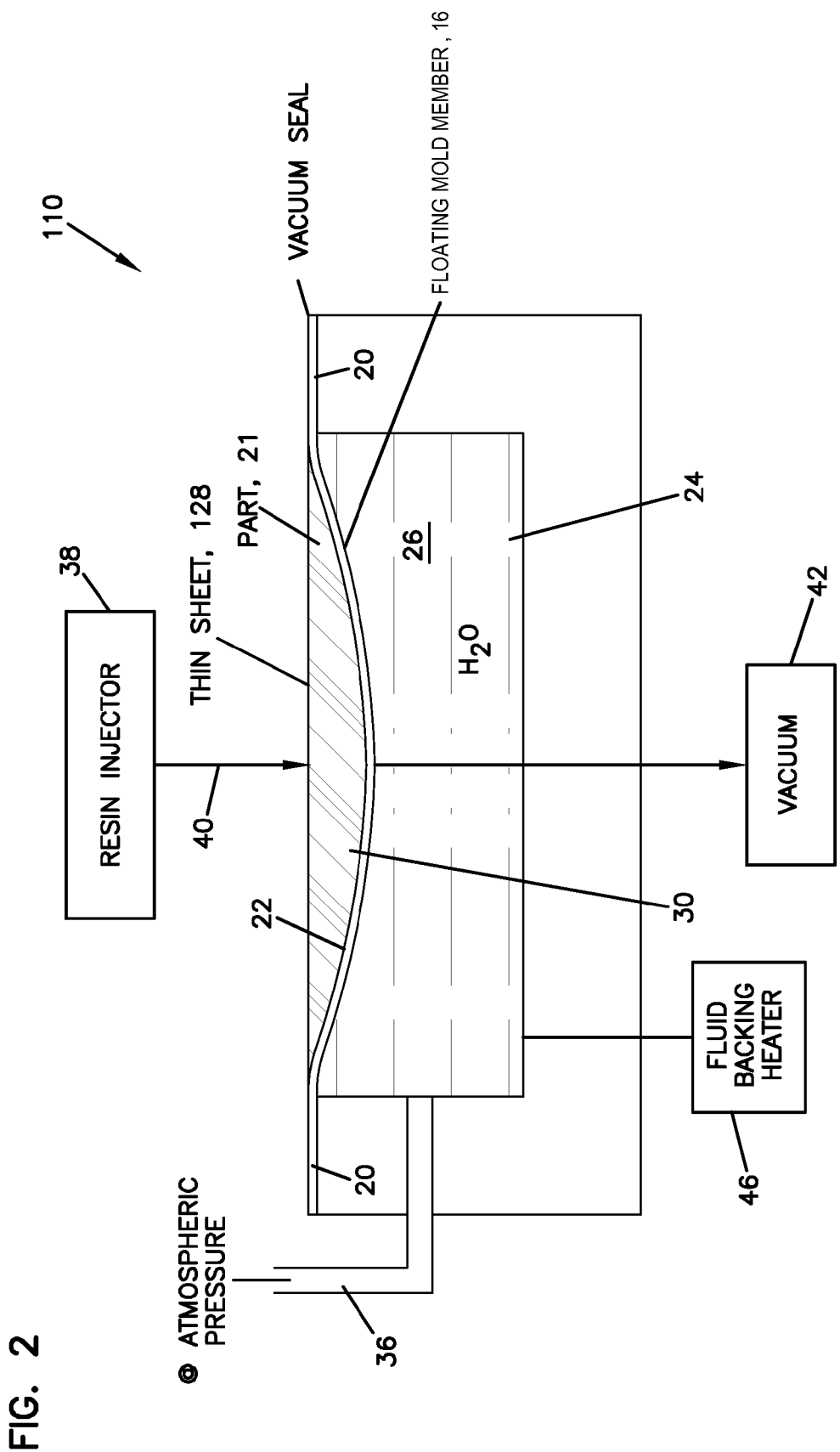
FIG. 2 is a schematic diagram illustrating another embodiment of an injection molding apparatus and method having features that are examples of inventive aspects in accordance with the principles of the present disclosure.

Referring now to FIG. 2, another embodiment of a molding apparatus 110 and method having features that are examples of inventive aspects in accordance with the principles of the present disclosure is shown. The molding apparatus 110 and method illustrated in FIG. 2 is similar to that shown in FIG. 1. However, rather than using a semi-rigid flexible upper mold 28, a relatively thin sheet 128 (e.g., a polymeric sheet such as a nylon sheet, etc.) may be used to enclose the top side of the floating mold member 16. In one embodiment, the sheet 128 may be about 5 mils to 25 mils in thickness. In another embodiment, the sheet 128 may be about 7 mils to 20 mils in thickness. In yet another embodiment, the sheet 128 may be about 8 mils in thickness.

The sheet 128 may be reused or be a throw-away part and may be substantially more cost-effective to manufacture than a harder mold such as a semi-rigid mold 28. Further, the thin nature of the sheet 128 allows more resin to be pulled from the part 21 thereby reducing costs. Moreover, the process can allow thinner, lighter-weight parts to be manufactured. The apparatus 110 and method shown in FIG. 2 may speed up prototyping and allow the use of more exotic molding materials, such as epoxies.

As used herein, a mold member may be referred to as a "semi-rigid" or a "semi-flexible" member if the mold member is capable of slightly flexing when pressurized resin or other molding material is injected into the mold chamber formed by at least one surface of the mold member.

With regard to the foregoing description, it is to be understood that changes may be made in detail, especially in matters of the construction materials employed and the shape, size and arrangement of the parts without departing from the scope of the present disclosure. It is intended that the specification and depicted aspects be considered exemplary only.

The invention claimed is:

1. A method of molding an article having a shape, the method comprising:
    providing a support housing defining a fluid chamber;
    providing a substantially non-compressible heat-conductive fluid within the fluid chamber;
    providing a first mold member, at least a portion of the first mold member supported by the support housing, the first mold member defining an upper molding surface for generally opposing the article to be molded, the first mold member defining a lower surface, wherein at least a portion of the lower surface is configured to be in contact with the fluid located within the fluid chamber such that thermal changes within the fluid in the fluid chamber are communicated from the lower surface to the upper molding surface through the first mold member;
    providing a polymeric sheet defining a second mold member, the polymeric sheet defining an upper surface that is to be generally at atmospheric pressure and a lower molding surface for generally opposing the article to be molded, the lower molding surface of the polymeric sheet configured to cooperate with the upper molding surface of the first mold member to form a molding plenum for molding the article, the polymeric sheet vacuum sealed with respect to the first mold member in forming the molding plenum;
    drawing down the polymeric sheet with respect to the upper molding surface of the first mold member using vacuum, such that, as vacuum is applied, the polymeric sheet deforms to generally conform to the shape of the article to be molded; and
    injecting molding resin into the molding plenum for forming the article, wherein the lower molding surface of the polymeric sheet directly contacts the molding resin in the molding plenum in forming the article.

2. A method according to claim 1, wherein the polymeric sheet includes nylon.

3. A method according to claim 1, wherein the polymeric sheet has a thickness between about 5 mils and 25 mils.

4. A method according to claim 3, wherein the polymeric sheet has a thickness between about 7 mils and 20 mils.

5. A method according to claim 4, wherein the polymeric sheet has a thickness of about 8 mils.

6. A method according to claim 1, wherein the molding resin is injected into the molding plenum by an injection port provided through the polymeric sheet.

7. A method according to claim 1, wherein the substantially non-compressible heat-conductive fluid is water.

8. A method according to claim 1, further comprising controlling the temperature of the fluid within the fluid chamber through a temperature control system.

\* \* \* \* \*